(No Model.) 6 Sheets—Sheet 4.

J. DELANEY.
PREPAYMENT SALE AND DELIVERY MECHANISM.

No. 569,147. Patented Oct. 6, 1896.

FIG. 6.

WITNESSES:
F. Norman Dixon
Thos. K. Lancaster.

INVENTOR:
John Delaney
By his Attorneys
Strawbridge & Taylor (No Model.) 6 Sheets—Sheet 5.
J. DELANEY.
PREPAYMENT SALE AND DELIVERY MECHANISM.

No. 569,147. Patented Oct. 6, 1896.

(No Model.) 6 Sheets—Sheet 6.

J. DELANEY.
PREPAYMENT SALE AND DELIVERY MECHANISM.

No. 569,147. Patented Oct. 6, 1896.

WITNESSES:
F. Norman Dixon
Thos. K. Lancaster

INVENTOR:
John Delaney
By his Attorneys,
Strawbridge & Taylor

UNITED STATES PATENT OFFICE.

JOHN DELANEY, OF PHILADELPHIA, PENNSYLVANIA, ASSIGNOR TO HELME & McILHENNY, OF SAME PLACE.

PREPAYMENT SALE AND DELIVERY MECHANISM.

SPECIFICATION forming part of Letters Patent No. 569,147, dated October 6, 1896.

Application filed November 14, 1895. Serial No. 568,910. (No model.)

*To all whom it may concern:*

Be it known that I, JOHN DELANEY, a citizen of the United States, residing in the city and county of Philadelphia, in the State of Pennsylvania, have invented certain new and useful Improvements in Prepayment Sale and Delivery Mechanisms, of which the following is a specification.

My invention relates generally to apparatus designed to contain or control a supply of vendible articles or material, arranged, upon the deposit upon or in adjacency to certain of its mechanism, of a coin of predetermined dimensions, to permit the delivery or release of a given quantity thereof,—and relates especially to apparatus of the foregoing character when constructed to operate in connection with fluids such as gas.

My present invention comprehends improvements upon a type of prepayment sale and delivery mechanisms invented by J. F. Sawyer and J. L. Purvis, and patented to them in and by Letters Patent of the United States, No. 468,999,—to which Letters Patent reference is to be made for the better comprehension of my present improvements.

My invention, in brief, aims to improve upon the mechanism set forth in the said patent, by providing new and improved mechanism for receiving the coin and rendering the same operative in the manipulation of the apparatus,—an improvement in the general organization of the apparatus as a whole whereby it is rendered more compact and capable of being inclosed in the ordinary casing of the meter,—the simplification of the working parts of the apparatus whereby not only is the number of the parts employed reduced but the device is rendered more positive and direct in action,—an improvement in the arrangement of the coin receptacle in its relation to the coin carrier receptacle,—and, finally, certain improvements in the valve by the seating and unseating of which the flow and delivery of the gas is controlled.

In the accompanying drawings I show, and herein I describe, a good form of a convenient embodiment of my invention, the particular subject-matter claimed as novel being hereinafter definitely specified.

In the accompanying drawings.

Similar letters of reference indicate corresponding parts.

Figure 6:
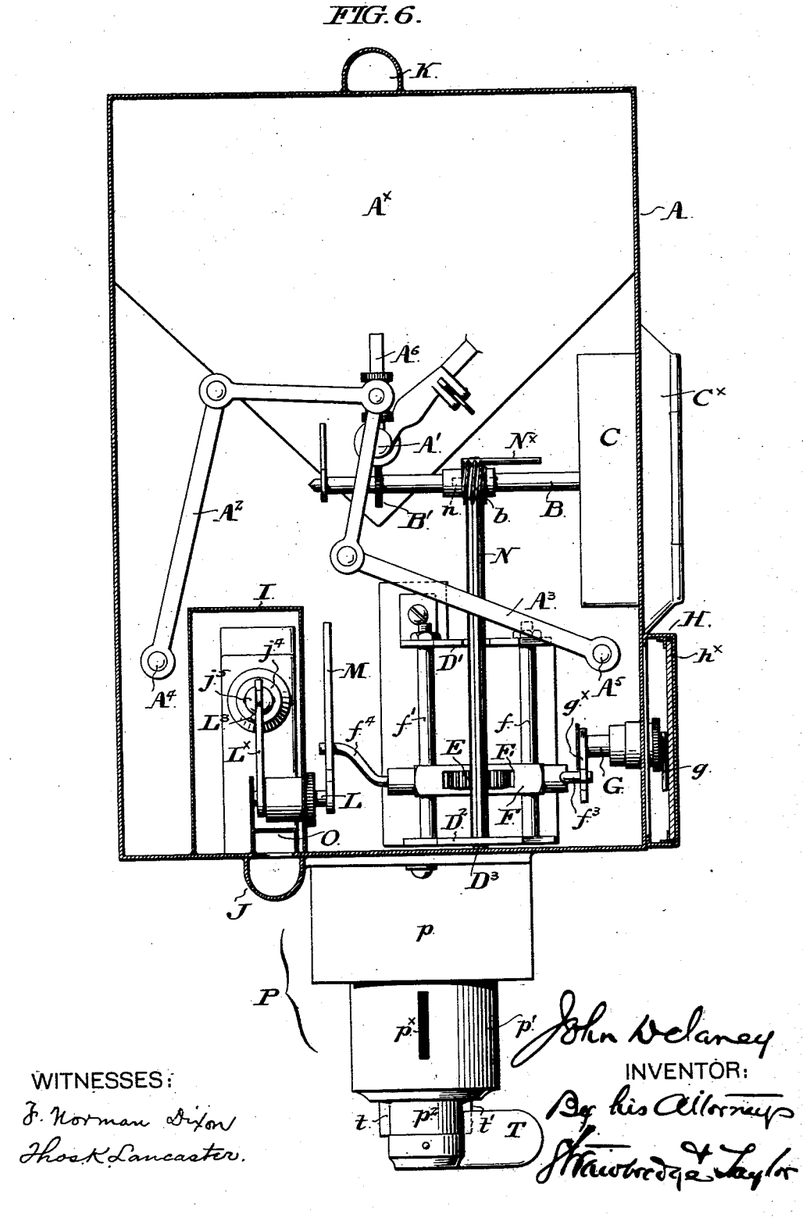
Figure 6 is a top plan view of a meter equipped with my improvements, the top or cover of the meter being supposed removed to exhibit the arrangement of the mechanism in the interior of the same.

In the accompanying drawings,

A indicates the casing of the meter, the same being of the usual form and construction, provided, as shown in Figure 6, with a valve plate $A^x$ upwardly through which projects the spindle $A'$ operated to rotation by the link arms $A^2$ and $A^3$ the outer extremities of which are connected to rocking studs $A^4 A^5$ connected with the diaphragms in the interior of the meter in the usual manner.

The inner extremities of said link arms are united to a crank or arm $A^6$ connected with said spindle $A'$ and rotatable about it.

A worm mounted upon said spindle $A'$ engages in a worm wheel $B'$ on the main arbor $B$ of the dial mechanism, and in the operation of the meter occasions the rotation of said main arbor.

The outer extremity of said main arbor is in gear with and operates the dial mechanism in the usual manner, the dial itself being contained with and protected by the usual transparent cover $C^x$.

The parts so far described are all of the usual and ordinary construction.

Figure 7:
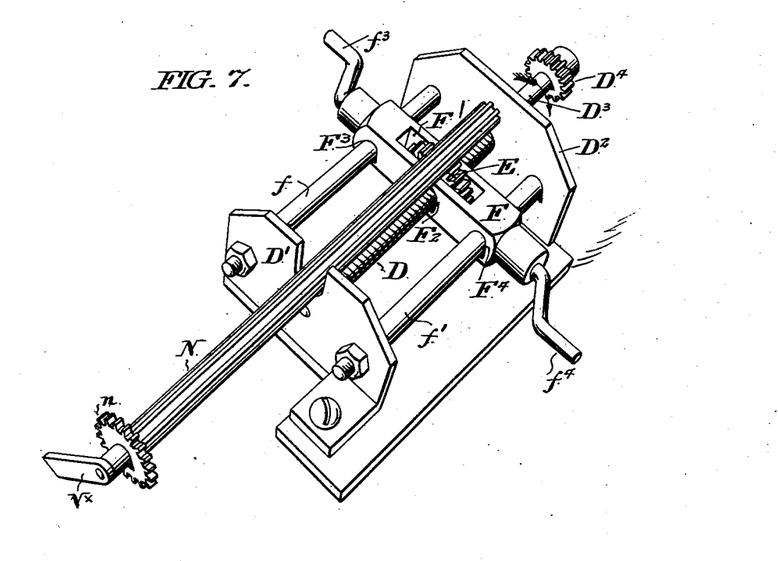
Figure 7 is a view in perspective of the mechanism for opening the valve and setting back the hand indicating the amount of gas paid for, under the actuation of the externally manually-operated coin carrier, and for gradually closing said valve and returning the hand to zero as the gas is consumed.

D, Figure 7, is a screw threaded shaft mounted free for rotation but held against longitudinal movement, in a pair of plates or other supports $D' D^2$ erected and secured in any desired manner in the upper chamber of the meter,—and provided with a prolongation $D^3$ which extends through the meter casing and is equipped in the exterior of the meter with a driven pinion $D^4$.

F is a follower or traveler, being a block provided with a recess $F'$ extending through its body from top to bottom, and the side walls of which recess are provided with apertures $F^2$ in alinement with each other and slightly larger diametrically than the shaft D and through which the shaft D extends, said follower being also provided with two openings $F^3 F^4$ in parallelism with the openings $F^2$.

$f f'$ are a pair of rods extending respectively through the openings $F^3 F^4$ and mounted as to their respective extremities in the respective supports $D' D^2$.

E is a gear wheel provided with a threaded bore and mounted within the recess $F'$ of the follower F and in engagement with said shaft D.

G, Figure 6, is a shaft mounted free for rotation in, but packed with respect to, an opening in the wall of the meter casing, and provided as to its protruding extremity with a pointer $g$ adapted to sweep across the face of an arc-shaped plate $h$ provided with a series of numbers from zero upward and inclosed within a casing H mounted on the exterior of the meter and provided with a glass front $h^x$.

The inner extremity of the shaft or spindle G is equipped with a lateral projecting arm $g^x$ in an opening in the outer extremity of which an arm $f^3$ projecting from the adjacent end of the follower engages.

Figure 8:
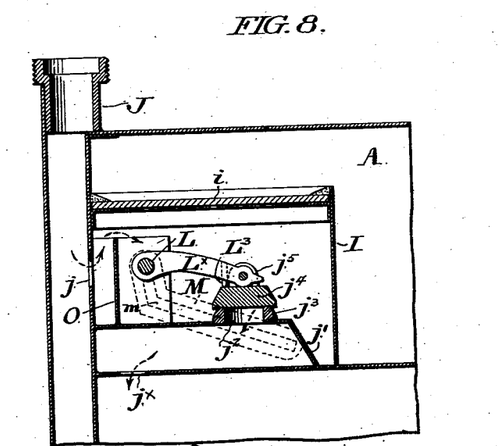
Figure 8 is a vertical, central, sectional, elevation through the valve casing, illustrating the arrangement of the valve.

I, Figures 6 and 8, is a casing of metal or other suitable material erected upon the floor of the upper chamber of the meter, said casing being built against the wall of the meter casing so that the wall of said meter casing forms also the wall of said boxing.

K is the outlet pipe of the meter, and J the inlet pipe, the latter extending down the exterior wall of the meter casing and provided with an opening $j$ by which its interior is placed in communication with the interior of the valve boxing.

$j^x$ is an opening through the base of the valve boxing down into the interior of the meter and supposed in communication with a duct leading to the bellows or valves ordinarily employed in meters of this class.

The interior of the boxing I is divided into two parts, an upper and a lower, by a diaphragm $j'$ which hermetically divides said upper and lower chambers from each other except for the opening $j^2$ in said diaphragm which opening is surrounded by a flange $j^3$ which constitutes a valve seat.

L is a shaft or spindle extending horizontally through that wall of the valve boxing which is adjacent to the follower F, to the inner end of which shaft or spindle, within the valve boxing, is mounted a valve arm $L^x$ the free extremity of which extends to a point above the valve seat $j^3$ and is equipped with a valve $j^4$.

The valve $j^4$ is shown as consisting of a plate of diameter slightly in excess of that of the said valve seat and provided with an upwardly-extending lug $j^5$ to which the outer extremity of the valve arm is pivotally connected by a transversely-extending pivot through both.

As a result of this connection between the valve and valve arm it will be seen that while the arm moves in the arc of a circle of which the shaft or spindle L is the center, the valve will always depend therefrom with its body in such a position as to be adapted to make close and accurate contact with the valve seat.

$L^3$, Figures 6 and 8, is a depending projection mounted upon the valve arm $L^x$, the lower extremity of which when the valve is down upon its seat $j^3$, rests upon the edge of the valve $j^4$.

As a result of this arrangement, when the valve arm is lifted to elevate the valve from its seat, the bearing of said projection $L^3$ against the inner edge of the valve, will, in the initial movement of the valve arm $L^x$, hold down the inner edge of said valve sufficiently to allow the outer edge of the valve to be raised from its seat slightly in advance of the inner edge, with the result that less force will be required to raise the valve against the pressure existing in the valve boxing.

The action of the mechanism herein described, in closing the valve, will be assisted not only by the weight of the valve itself, but by the gas pressure existing within the valve casing, which, as will be understood, constantly tends to hold the valve on its seat.

The outer extremity of the shaft or spindle L upon the exterior of the valve boxing is provided with an arm or plate M rigidly mounted upon it and provided with a longitudinally-extending slot, which slot while extending in a right line throughout the body of said plate M, turns at the inner end of said plate and extends a short distance in a direction almost at right angles with the body of the slot.

$f^4$ is an arm or projection extending from the adjacent end of the follower F and engaged within the slot $m$ of the plate M.

N, Figures 6 and 7, is what I term an elongated pinion, supported with its teeth always in mesh with the peripheral teeth of the gear E and geared directly to the main arbor B through any convenient mechanical gearing.

The gearing shown in the drawings consists of a worm $b$ mounted upon said main arbor and engaged with a worm wheel $n$ on the adjacent end of said elongated pinion.

The elongated pinion is conveniently mounted as to one extremity in the support $D^2$ and as to its other extremity in a small plate $N^\times$ vertically erected from the floor of the upper chamber as shown in Figures 6 and 7.

The intermediate portion of the elongated pinion lies in a U-shaped recess in the plate D'.

The operation of the apparatus so far described will be readily understood; when the follower occupies a position in close proximity to the support $D^2$ the stud or projection $f^3$ will, through the arm $g^\times$ and shaft or spindle G, hold the pointer $g$ to a position over the zero mark of the dial $h$, and the stud or projection $f^4$ of said follower will by its engagement in the slot $m$ of the plate M hold the valve $j^4$ down upon its seat.

In this position of parts the gas cannot pass from the inlet pipe J, supposed in connection with the main, to the interior of the meter, being unable, although filling the valve box I, to pass through the opening $j^2$, and therefore the supply to the service pipes is closed.

If, now, the shaft D be rotated to the right (Fig. 7) it will, being itself held against longitudinal movement, and the gear E being held against rotation by its engagement with the elongated pinion, operate to force said gear E and the follower away from the support $D^2$, and the follower will, in such movement, owing to the predetermination of the size and adjustment of the parts, by means of the arm or projection $f^3$ carry the pointer $g$ across the dial a distance controlled by the rotation imparted to the shaft D, and, by means of the arm or projection $f^4$ sliding along the slot $m$ of the plate M, lift the valve $j^1$ from its seat.

The gas now having access through the opening $j^2$ to the interior of the meter and to the service pipes within the house, and being supposed progressively consumed within the house, the meter in its operation of registering the amount of gas passing through it, will occasion the rotation of the main arbor B, and, of course, the operation of the ordinary dial mechanism C, with which my invention has no connection.

In the rotation of the main arbor B the worm $b$ will, through the wheel $n$, occasion the rotation of the elongated pinion N, and consequently of the gear E, with the result that said gear will be caused to travel toward the support $D^2$, carrying, of course, the follower F with it, and the follower, as it travels, will gradually, of course, carry the pointer $g$ back to the zero point of the dial $h$, and gradually close the valve, the zero point being reached by the pointer, and the valve being closed, at the same time that the follower comes into contact with the support $D^2$, or reaches the limit of its movement.

As will be understood, when the follower reaches the limit of its travel, further flow of gas through the meter is prevented, even though by the presence of a foreign substance on the valve seat, or from other causes, the closing of the valve should be interfered with, for the reason that, further rotation of the gear E, and of the elongated pinion, being obviously prevented, said pinion, by its engagement with the main arbor locks said arbor and the spindle A' against rotation.

The operation of the slotted plate M under the actuation of the projection engaged with it, in the opening and closing of the valve, is fully set forth in the Letters Patent hereinbefore referred to, and upon which my present invention is an improvement, and I do not, therefore, describe its operation in detail.

Suffice it to say that during the time that the projection is engaged in the long straight portion of the slot the valve is held open, while, when the projection enters the angular foot of the slot, it occasions the tilting of the plate M, and, through the shaft or stud L, the closing of the valve.

In my improved apparatus, in which the elongated pinion is geared through a worm directly with the main arbor, B, great simplicity and compactness of construction and ease and directness of operation is manifestly attained.

In the construction of the meter shown in the patent hereinbefore referred to, motion is taken from the spindle A'. Now as the spindle rotates some eighteen times to one revolution of the main arbor, and as it is of advantage that the elongated pinion should be rotated slowly, because of the short distance to be traversed by the follower before the gas is shut off, by gearing said elongated pinion directly to the main arbor, I gain the advantages of dispensing with the gearing employed in the structure of the patent,— drive the elongated pinion slowly,—and by fewness of parts reduce the expensiveness of construction, and also reduce the amount of lost motion.

In order to prevent the possibility of access to the interior of the valve boxing I, through the pipe J and opening $j$, for the dishonest unseating of the valve, I provide a baffle plate O erected from the diaphragm $j'$ and extending vertically upward past said opening $j$ to a point in proximity to the top of the boxing, with the result that while not obstructing the flow of gas an effective barrier is made against access to the valve.

I now proceed to describe the devices by which movement of rotation may be imparted to the shaft D as hereinbefore referred to.

Figure 1:
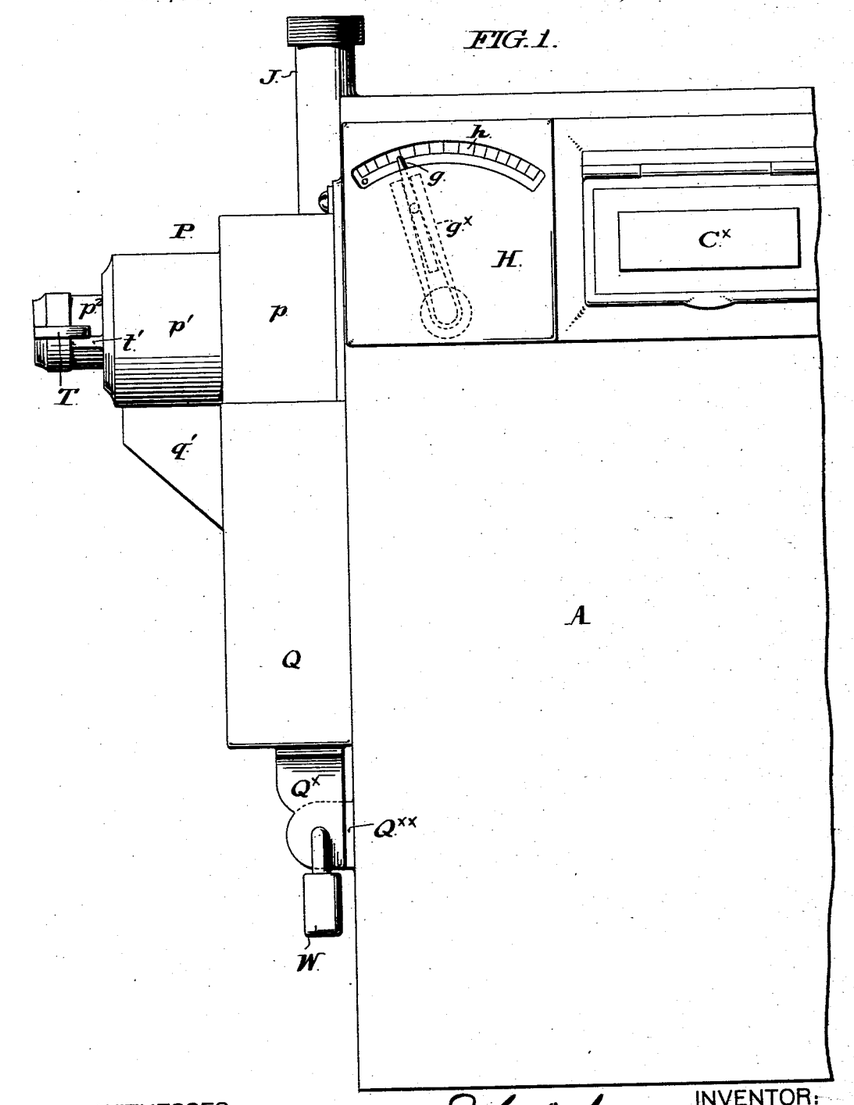
Figure 1 is a view in front elevation of a meter embodying my invention.
Figure 2:
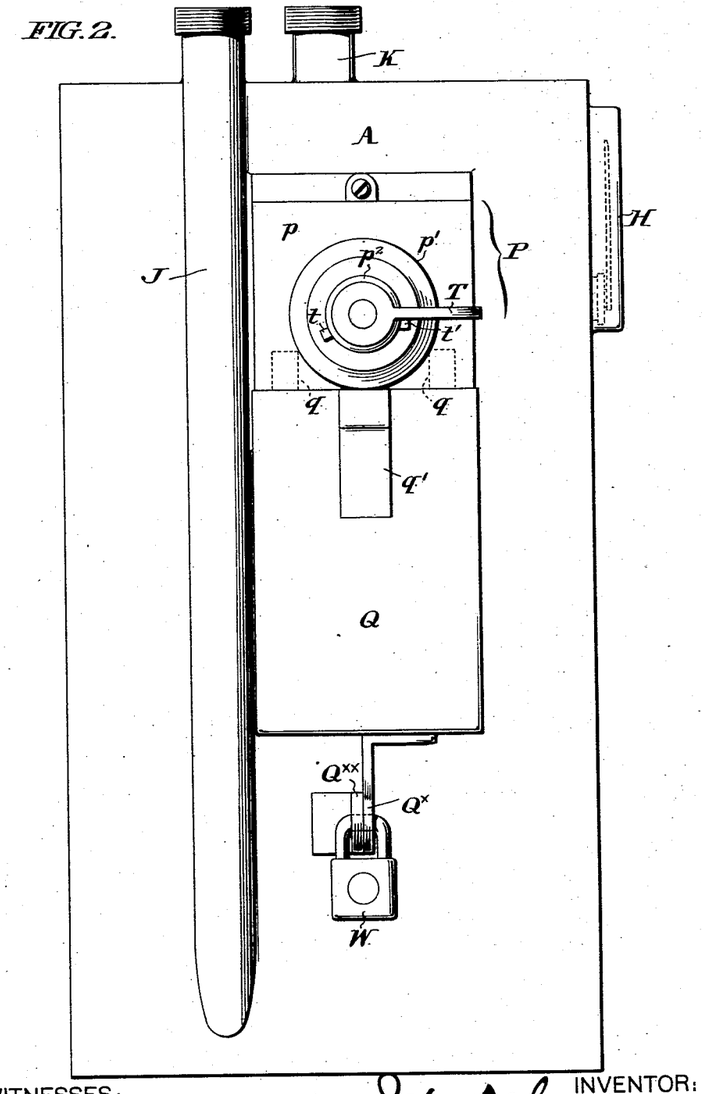
Figure 2 is a side elevational view of the said meter, sight being taken from the left hand side of Figure 1.
Figures 3, 4, 5, 9:
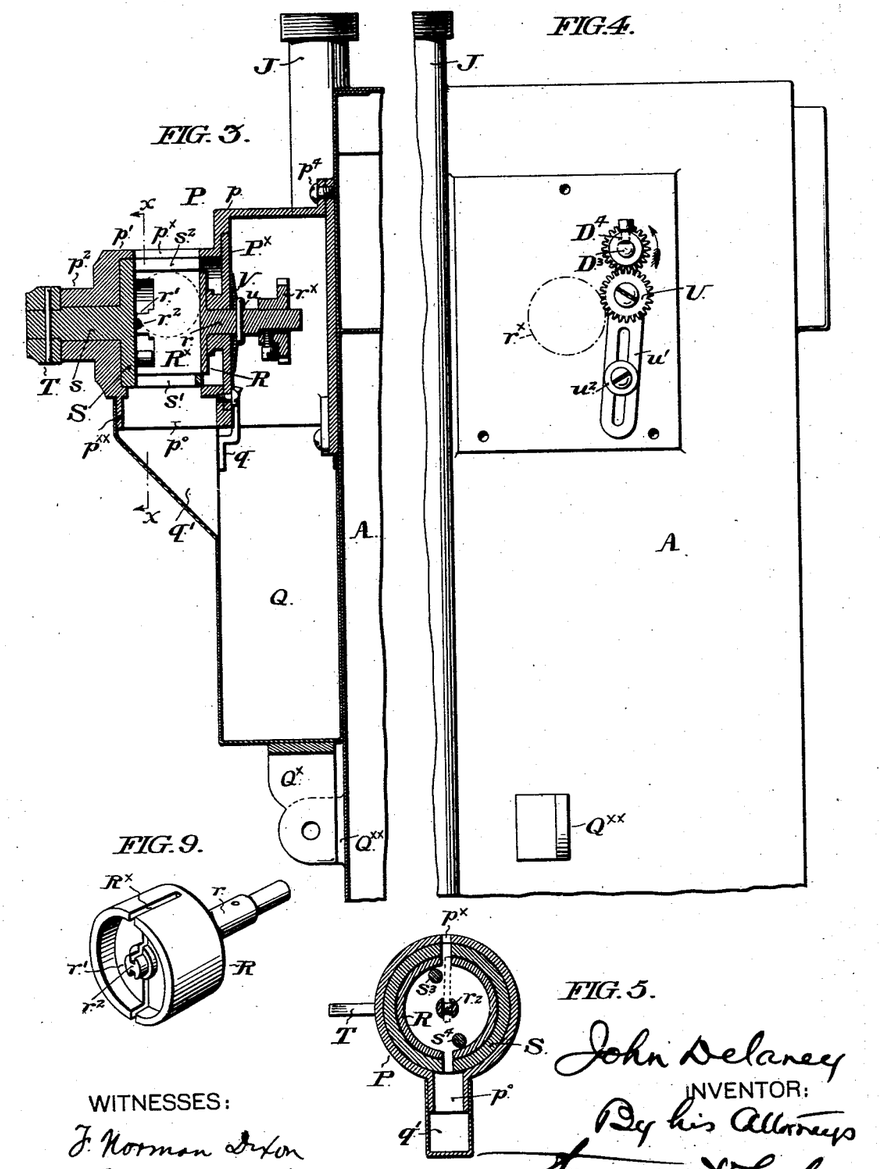
Figure 3 is a central, vertical, sectional, elevational, view of the coin carrier and its associated parts, and the coin box.
Figure 4 is a view of gear-wheels which are associated in operation with the coin carrier, as hereinafter explained.
Figure 5 is a transverse sectional elevation of the coin carrier, the section being supposed on the dotted line $x$—$x$ of Figure 3 and sight being taken in the direction of the arrows applied to said line.
Figure 9 is a perspective view of the coin carrier cup shown in Figures 3 and 5.

P, Figures 1, 2, and 3, is a supplemental casing for the coin manipulating mechanism, the same consisting of a hollow shell preferably made as an integral casting the base or inner portion $p$ of which is rectangular and the body portion $p'$ of which is substantially cylindrical and provided with a projecting neck $p^2$.

The under face of the square portion of the casing and also the lower face of said casing, are open and the said casing is attached in any desired manner upon the exterior of the meter, and incloses the protruding extremity of the shaft D with its gear wheel $D^4$.

$p^\times$ is a coin slot formed in the upper face of the body of the casing.

$p^0$ is an opening in the lower face of the said body in alinement with the coin opening $p^\times$, and formed in a depending boss $p^{\times\times}$.

Q is a coin receptacle, the same consisting of a box conveniently formed of metal and mounted upon the exterior of the meter casing below the casing P and in connection therewith.

The coin box is of breadth, and depth from front to back, of conveniently the same dimensions as the base of the casing P, and the upper end of said coin box is open so that the front wall and the side walls of said coin box overlap the front and side walls of the lower portion of the base of the casing P, and are secured thereto by keepers, braces, or stays, $q$, (Figure 3) secured to the inner face of the front wall of the coin box and projecting above the edge of the front wall of the base of the casing P.

By this means, the screws which secure the lower portion of the supplemental casing P to the meter are concealed by said coin box, so that the only attaching screw of said supplemental casing P exposed is that designated $p^4$ and applied to its upper end.

The coin box Q is provided with a wing or extension $q'$ integral with its body which overlaps and incloses the boss $p^{\times\times}$ in the lower face of the body of the casing P.

The lower end of the coin box Q is provided with a solid lug $Q^\times$ having apertures which register with corresponding apertures in a projection $Q^{\times\times}$ extending from the wall of the meter casing.

W is a pad-lock by which engagement with the lugs $Q^\times$ and $Q^{\times\times}$ secures the coin box firmly in position, as shown in Figures 2 and 3.

When the coin box is thus locked in position, as will be understood, it conceals, as stated, the screws which secure the lower portion of the casing P to the meter casing, and also protects from manipulation the stays $q$ by which its own upper end is secured to said casing P.

The only fastening device which secures the coin box visible or accessible is therefore the lock itself, whereby it results that the contents of the coin box are very thoroughly and securely guarded against abstraction.

$P^\times$ is a diaphragm mounted in the interior of the shell or casing P, and extending diametrically across the interior of the same at the base of the body thereof.

R, Figures 3, 5, and 9, is what I term a coin carrier cup the same being a cup-shaped structure supported within and concentrically with respect to the hollow interior of the body P' of the shell P, by means of an axial stud or spindle $r$ projecting from its base through a suitable bearing formed in the diaphragm $P^\times$, which stud or projection is equipped at its inner extremity with a gear wheel $r^\times$.

$r'$ is a boss centrally disposed within the interior of the cup R, the top of which is substantially flush with the edge of said cup R.

$R^\times$ is a slot extending diametrically through the cup R, said slot opening through the upper edge of the wall of the cup and through the body of the said boss $r'$, but not through the top of the latter, a small stop $r^2$ remaining at the top of said boss.

S is a driving gear cup supported within and free for rotation with respect to the case by means of an axial stud $s$ mounted in and protruding beyond the outer extremity of the neck $p^2$ of the casing.

Said cup is provided with coin slots $s'$ $s^2$ in its wall, said slots being formed opposite each other, and the slot $s^2$ being slightly longer than the slot $s'$.

The proportions of the casing $p'$, driving cup S, and coin carrier cup R, are such that the three are disposed in nested arrangement as shown particularly in Figures 3 and 5, with their walls in close proximity to each other, but the said cups are normally free for rotation with respect to each other and to the casing.

$s^3$ $s^4$ are pins mounted upon the inner faces of the bottom of the driving gear cup S, and extending into the space in the coin carrier cup between the wall of said latter cup and its central boss.

T is a radial handle mounted upon the protruding extremity of the stud $s$ of the driving cup, and $t\ t'$ are a pair of permanent stops mounted upon the shell P and adapted to be encountered by and limit the movement of said handle.

When said handle is in contact with the stop $t'$ the larger slot of the cup S and one of the slots of the cup R are in registry with the slot $p^\times$; when the said handle is in contact with the stop $t$ the smaller slot of the cup S and one of the slots of the cup R are in registry with said slot $p^\times$.

U, Figure 4, is an idle gear wheel in mesh with the wheel $r^\times$ and $D^4$ and adapted to communicate motion from the former to the latter, said idle wheel U being mounted for rotation upon a slotted plate $u'$ through the slot of which a screw $u^2$ extends into the body of the casing to secure said plate $u'$ and wheel U in proper position.

As will be understood, the parts are proportioned to receive a coin of a given size which may be arbitrarily predetermined by the constructor.

As will be understood also, the driving cup S may be freely rotated ordinarily as it has no mechanical connection with the driven gear cup.

My improved mechanism is, however, so arranged that when the coin is deposited within the slot provided for it said coin does not of itself automatically trip or release the mechanism which occasions delivery of the article which the apparatus as a whole controls, but serves as the connecting link between normally unconnected devices, to-wit, the driving cup and the coin carrier cup, with the result that rotation manually imparted to the driving gear cup is through said coin and the coin carrier cup transmitted to the shaft D and the valve-opening mechanism, which latter is operated in a manner hereinbefore described.

When, then, a coin of appropriate size is deposited within the slot $p^\times$ of the casing P it drops through the said slot and through the slot of the driving cup S until it comes to rest as to one edge upon the stop $r^2$ at the apex of the boss $r'$ and as to the other edge against the inner face of the bottom of the coin carrier cup R, and in this position projects into the space of the coin carrier cup between its central boss and wall.

The handle T being then grasped by the operator and rotated to the left, occasioning, of course, the rotation of the driving cup S, the stud $s^3$ of said driving cup encounters the edge of the coin rigidly maintained in position in the coin carrier cup, and, through said coin, occasions the movement of the latter in association with that of the driving cup until the handle comes to rest against the stop $t$.

The movement thus occasioned of the coin carrier cup is transmitted through the gear wheels $r^\times$ U and $D^4$ to the screw shaft D with the result already at length described.

As will be understood, the amount or extent of the movement imparted to the wheel D by a single sweep of the handle T may be regulated by the size of the removably applied wheels $r^\times$ and $D^4$, and either of said wheels may be readily removed and a wheel of larger or smaller diameter substituted to give a larger or smaller quantity of gas for a coin of the size fixed upon, without requiring readjustment or re-arrangement of any other of the parts.

The wheel U may, by loosening the screw $u^2$, be, with its supporting plate, adjusted to any desired position required to accommodate the various sized wheels, and locked in such adjusted position by tightening said screw $u^2$.

As will be understood, should a coin of dimensions smaller than those of the coin by which the machine is intended to be operated, drop within the slot $p^\times$, it will not be arrested in its descent by the stop $r^2$ but will drop through and descend into the coin box Q and therefore will not be operative to connect the driving cup with the coin carrier cup in the manner hereinbefore referred to.

Should, on the other hand, a coin of larger dimensions be entered in the slot $p^\times$ it cannot descend into operative position by reason of the fact that the slots of the cups are not sufficiently large to receive it.

When the lever T has been thrown after the insertion of a coin the gear cup with said coin in position rotates until the coin drops from it and into the coin box Q leaving the slot $s'$ uppermost instead of the slot $s^2$.

Therefore it will be necessary for the operator before dropping another coin in the slot to throw the handle T to the right to bring the slot $s^2$ uppermost.

When the slot $s'$ is uppermost it will not, by reason of its shortness, admit the insertion of a coin of the predetermined size, and this fact will indicate to the operator that the cup is in reverse position and that the handle must be thrown back to its original position.

V is a star-spring or similar contrivance confined between a rib $u$ on the spindle $r$ and the face of the diaphragm $P^\times$, to hold the coin carrier cup against irregular movements.

As will be understood, when, after the insertion of a coin, the handle is thrown until it comes into contact with the stop $t$, the coin-carrier cup R is carried around until its slot in which the coin has been inserted is lowermost, and its other slot is in registry with the slot $p^\times$ of the supplemental casing, and in position to receive another coin.

When, then, the handle T is carried back to the right (Figure 2) until it comes into contact with the stop $t'$, to be in position for another throw, and to carry the driving cup S into position with its slot $s^2$ uppermost and in registry with the slot $p^\times$, this movement of the cup S is without effect upon the cup R which is already in proper position, because the coin having dropped into the coin receptacle there is no connection between the two cups, and the engagement of the cup R with the shaft D tends to maintain said cup against such slight movement as might be imparted to it by the friction of the cup S.

As will be observed, the two cups R S are fitted very closely together and the exterior of the cup S is in close contact with the inner face or wall of the casing with the result that it will be impossible for a dishonestly inclined user to fraudulently obtain gas by any such expedient as dropping into the slot a coin with a string or wire attached, and, after the valve has been opened, withdrawing said coin,—for the reason that the rotating cups being in shearing contact with each other would cut the wire or string, or, failing in this, said string or wire would become so entangled with the boss $r'$ and the studs $s^3$ and $s^4$, in the rotation of the cups, that withdrawal of the coin would be impossible.

Figure 10:
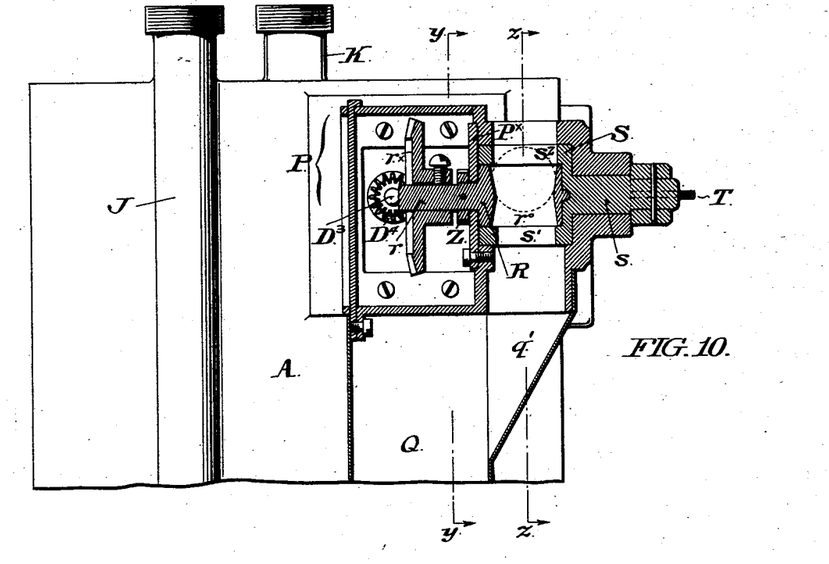
Figure 10 is a view in central vertically sectional elevation of a modified form of coin carrier cup and driving gear cup, and of gearing by which the coin carrier cup is connected with the extension of the shaft D.
Figure 11:
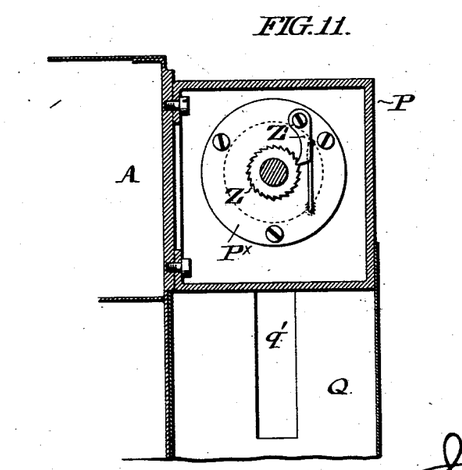
Figure 11 is a vertical sectional elevational view of the same, the section being supposed on the dotted line $y$—$y$ of Figure 10, and sight being taken in the direction of the arrows applied to said line.
Figure 12:
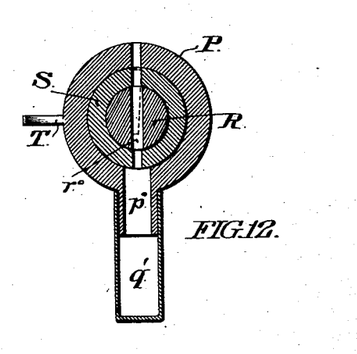
Figure 12 is a similar view, the section being supposed on the dotted line $z$—$z$ of Figure 9.

In the modified form shown in Figures 10, 11, and 12, the casing which incloses the gear cups is the same in general form and arrangement as that hereinbefore described, except that its side instead of its base is seated against and secured to the wall of the meter casing with the result that the axis of rotation of the coin carrier and driving gear cups is parallel with, as opposed to being perpendicular to, said wall.

In this arrangement, accordingly, the wheel $D^4$ mounted on the prolongation $D^3$ of the shaft D, is a bevel gear wheel, and the wheel $r^x$ on the stud or shaft $r$ of the coin carrier cup is also a bevel gear wheel in mesh therewith.

The said wheel $r^x$ is provided with a sleeve which is seated upon the stud $r$, and secured in such position by a set screw or otherwise. These bevel gear wheels may be readily removed and others having different number of teeth substituted.

The driving gear cup S is in this embodiment of my invention shown as a cup shaped structure having two slots, one on each side, the arrangement being such that one of said slots, $s^2$, is of the proper size to admit the coin adapted to operate the machine, and the other, $s'$, is too small to admit said coin, the arrangement being in this respect the same as that hereinbefore set forth with reference to the preferred embodiment of my invention.

The driving gear cup is provided with a stud $s$, and an operating handle, employed in connection with stops as hereinbefore described.

The coin carrier cup R is formed as a solid block accurately filling the space within the interior of the driving gear cup and adapted to rotate freely with respect thereto. A slot $r^0$ extends clear through the body of said coin carrier cup, the mouths of which slot are of such length and breadth as to permit a coin of the proper size to partially enter said slot. The edges of the slot, however, at or about the center of the coin carrier cup converge and operate to stop the coin dropped therein and support it in the position shown in Figure 10, with its rim engaged in the slot $s^2$ of the driving gear cup.

The coin thus serves to lock or latch the coin carrier cup and the driving gear cup together, and thereupon rotation being imparted to the handle T, the driving gear cup will carry the coin carrier cup around with it (communicating motion through the bevel gear to the shaft D within the meter) until said coin comes into registry with the outlet coin slot in the lower portion of the casing, whereupon the coin drops through said slot into the coin receptacle. The handle T is thereupon thrown back to its original position, carrying the coin driving cup with it, until the slot $s^2$ of said cup is in registry with the coin inlet slot in the casing, as hereinbefore described.

In this reverse movement of the cup S the coin carrier cup R does not participate, but remains in the position in which it was left when the coin dropped from it.

The two mouths of the slot of the coin carrier cup are counterparts of each other, and as a half revolution, exactly, is given to said cup each time the cup S is operated as described, said cup R is always left with one or the other of the mouths of its slot uppermost.

Z is a ratchet wheel fixedly mounted on the stud or shaft of the cup R and Z' is a pawl mounted upon the face of the diaphragm $P^x$, and pressed by a spring $Z^x$ constantly into engagement with said ratchet-wheel.

This ratchet mechanism, obviously, precludes the possibility of reverse rotation of the coin carrier cup.

Having thus described my invention, I claim and desire to secure by Letters Patent.

1. In combination with a gas meter provided with an inlet pipe and an outlet pipe, a valve casing or boxing mounted upon the interior of the meter casing, an inlet opening in the wall of the meter casing, leading from the inlet pipe to the interior of the valve casing, an opening leading from the valve casing to the gas measuring mechanism of the meter, a valve controlling said last mentioned opening, means for operating said valve, and a plate mounted within the valve casing in the vicinity of the wall in which the inlet opening is formed and extending past said inlet opening,—substantially as set forth.

2. In a prepayment and delivery apparatus, in combination with a shaft the rotation of which controls the delivery of merchandise, a cylindrical coin carrier cup mounted free for rotation in the vicinity of said shaft, and controlling the same, a cylindrical driving cup mounted in nested relationship with respect to said coin carrier cup, and adapted for rotation in both directions, a slot in the exterior cup, a slot in the interior cup adapted to be placed in registry with the first named slot, means provided in the first named cup for arresting a coin in its descent, the arrangement being such that the arrested coin operates to lock or latch the two cups together, a casing inclosing said cups and embodying a coin slot, one of said cups having a stud or shaft extending to the exterior of the casing, a handle mounted on said stud or shaft, and stops which limit the throw of said handle in both directions, substantially as set forth.

3. In a prepayment and delivery apparatus, in combination with a shaft the rotation of which controls the delivery of merchandise, a coin carrier cup mounted free for rotation in the vicinity of said shaft, and controlling the same, a driving cup mounted in nested relationship with respect to said coin carrier cup, a slot in the exterior cup, a slot in the interior cup adapted to be placed in registry with the first named slot, means provided in the interior cup for arresting a coin in its descent, the arrangement being such that the arrested coin operates to lock or latch the two cups together,—means for supporting said cups, and means for imparting manual rotation directly to one of them, and means for adjusting the gearing through which motion is communicated from the coin carrier cup to the shaft,—substantially as set forth.

4. In a prepayment and delivery apparatus, in combination with a shaft the rotation of which controls the delivery of merchandise, a coin carrier cup, mounted free for rotation in the vicinity of said shaft, and adapted to communicate motion to it, a coin slot formed in the wall of the cup, a driving cup mounted in nested arrangement with and free for rotation with respect to, said coin carrier cup, a coin slot formed in the wall of said cup, a pin mounted in the base of one of said cups and a device for arresting a coin in its descent, mounted in the other of said cups, a casing in which said cups are mounted, and a coin receiving compartment or box,—substantially as set forth.

5. In a prepayment and delivery apparatus, in combination with a shaft the rotation of which controls the delivery of merchandise, a coin carrier cup mounted free for rotation in the vicinity of said shaft and adapted to communicate motion to it, a coin slot formed in the wall of the cup, a device in the center of the cup, adapted to arrest a coin in its descent through the cup, a cup mounted in nested arrangement with and free for rotation with respect to, said coin carrier cup, a coin slot formed in the wall of said cup a pin mounted in the base of the last mentioned cup, a casing in which the said cups are mounted, and a coin receiving compartment or box,—substantially as set forth.

6. In a prepayment and delivery apparatus, in combination with a shaft the rotation of which controls the delivery of merchandise, a coin carrier cup mounted free for rotation in the vicinity of said shaft, gearing connective of said cup and said shaft, two coin slots formed respectively in diametrically opposite sides of said cup, a slotted boss in the center of said cup, adapted to arrest a coin in its descent, a driving cup mounted in nested arrangement with and free for rotation with respect to said coin carrier cup, two coin slots formed respectively in diametrically opposite sides of said cup, a pin mounted in the base of the last mentioned cup adapted to encounter a coin supported in the first mentioned cup, a casing in which said cups are mounted, a handle for operating the cups, and a coin receiving compartment, substantially as set forth.

7. In a prepayment and delivery apparatus, in combination with a shaft the rotation of which controls the delivery of merchandise, a coin carrier cup mounted free for rotation in the vicinity of said shaft, gearing connective of said cup and said shaft, two coin slots formed respectively in diametrically opposite sides of said cup, a slotted boss in the center of said cup, adapted to arrest a coin in its descent, a driving cup mounted in nested arrangement with and free for rotation with respect to said coin carrier cup, two coin slots formed respectively in diametrically opposite sides of said cup, one of said slots being too small to admit a coin of the size required to operate the apparatus, a pin mounted in the base of the last mentioned cup adapted to encounter a coin supported in the first mentioned cup, a casing in which said cups are mounted, a handle for operating the cups, and a coin receiving compartment,—substantially as set forth.

8. In a prepayment and delivery apparatus, in combination with a shaft the rotation of which controls the delivery of merchandise, a coin carrier cup mounted free for rotation in the vicinity of said shaft, gearing connective of said cup and said shaft, two coin slots formed respectively in diametrically opposite sides of said cup, a slotted boss in the center of said cup, adapted to arrest a coin in its descent, a driving cup mounted in nested arrangement with and free for rotation with respect to said coin carrier cup, two coin slots formed respectively in diametrically opposite sides of said cup, a pin mounted in the base of the last mentioned cup adapted to encounter a coin supported in the first mentioned cup, a casing in which said cups are mounted, a coin receiving slot formed in said casing with which slots in the cups are adapted to be brought into registry, a coin delivery opening formed in the lower portion of said casing, a handle for operating the cups, and a coin receiving compartment, substantially as set forth.

9. In a prepayment and delivery apparatus, in combination with a shaft the rotation of which controls the delivery of merchandise, a coin carrier cup mounted free for rotation in the vicinity of said shaft, gearing connective of said cup and said shaft, two coin slots formed respectively in diametrically opposite sides of said cup, a slotted boss in the center of said cup, adapted to arrest a coin in its descent, a driving cup mounted in nested arrangement with and free for rotation with respect to said coin carrier cup, two coin slots formed respectively in diametrically opposite sides of said cup, a pin mounted in the base of the last mentioned cup adapted to encounter a coin supported in the first mentioned cup, a casing in which said cups are mounted, a handle for operating the cups, stops for limiting the throw of the handle one of said stops arresting said handle at the point in its travel when it has carried the driving cup into such position that its receiving slot is in registry with the receiving slot of the casing, and a coin receiving compartment,—substantially as set forth.

10. In a prepayment and delivery apparatus, in combination with a shaft the rotation of which controls the delivery of merchandise, a coin carrier cup mounted free for rotation in the vicinity of said shaft, gearing connective of said cup and said shaft, two coin slots formed respectively in diametrically opposite sides of said cup, a slotted boss in the center of said cup, adapted to arrest a coin in its descent, a driving cup mounted in nested arrangement with and free for rotation with respect to said coin carrier cup, two coin slots formed respectively in diametrically opposite sides of said cup, one of said slots being too small to admit a coin of the size required to operate the apparatus, a pin mounted in the base of the last mentioned cup adapted to encounter a coin supported in the first mentioned cup, a casing in which said cups are mounted, a coin receiving slot formed in said casing with which slots in the cups are adapted to be brought into registry, a coin delivery opening formed in the lower portion of said casing, a handle for operating the cups, stops for limiting the throw of the handle, one of said stops arresting said handle at the point in its travel where it has carried the driving cup into such position that its receiving slot is in registry with the receiving slot of the casing, and a coin receiving compartment,—substantially as set forth.

11. In a prepayment and delivery mechanism, in combination with a main casing, a supplemental casing attached to the main casing at its top and bottom and open at the lower side, and containing mechanism adapted to receive a coin and to deliver it through the open lower side of said supplemental casing, a coin box or receptacle, the upper end of which is open so that the coin box and supplemental casing are adapted to be arranged with the edge of the one overlapping the edge of the other, keepers adapted to secure the box and casing in this relation, and a lock engaged with lugs mounted respectively upon the main casing and supplemental casing, substantially as set forth.

12. In combination with the valve casing, the valve seat, the valve arm, and the valve pivotally supported on said arm, a projection mounted on said arm and arranged to make contact with the valve near the margin thereof, substantially as set forth.

In testimony that I claim the foregoing as my invention I have hereunto signed my name this 30th day of October, A. D. 1895.

JOHN DELANEY.

In presence of—
F. NORMON DIXON,
THOS. K. LANCASTER.